(12) United States Patent
Lynds

(10) Patent No.: US 10,903,678 B2
(45) Date of Patent: Jan. 26, 2021

(54) APPARATUS AND METHOD FOR PROVIDING BIDIRECTIONAL VOLTAGE SUPPORT

(71) Applicant: MAXWELL TECHNOLOGIES, INC., San Diego, CA (US)

(72) Inventor: Robert Shaw Lynds, La Mesa, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 14/887,838

(22) Filed: Oct. 20, 2015

(65) Prior Publication Data

US 2016/0111907 A1     Apr. 21, 2016

Related U.S. Application Data

(60) Provisional application No. 62/066,733, filed on Oct. 21, 2014.

(51) Int. Cl.
*H02J 7/00*     (2006.01)
*H02J 7/14*     (2006.01)
*H02J 7/34*     (2006.01)

(52) U.S. Cl.
CPC ............ *H02J 7/1438* (2013.01); *H02J 7/342* (2020.01); *H02J 7/345* (2013.01); *B60L 2210/10* (2013.01); *B60L 2240/547* (2013.01); *H02J 7/0024* (2013.01); *Y02T 10/70* (2013.01); *Y02T 10/72* (2013.01)

(58) Field of Classification Search
CPC ...... H02J 7/0024; H02J 7/0054; H02J 7/0072; H02J 7/345; H02J 7/1438; B60L 7/10

USPC .......................................................... 320/134
See application file for complete search history.

(56) References Cited

U.S. PATENT DOCUMENTS

| | | | | |
|---|---|---|---|---|
| 6,087,812 | A * | 7/2000 | Thomas | H01M 10/4264 320/141 |
| 8,729,864 | B2 * | 5/2014 | Dittmer | B60L 3/0007 320/134 |
| 8,773,075 | B2 * | 7/2014 | Shiramatsu | H01M 10/482 320/136 |
| 2003/0164644 | A1 * | 9/2003 | Sasaki | H02J 7/345 307/5 |
| 2005/0110468 | A1 | 5/2005 | Turner et al. | |
| 2008/0094042 | A1 * | 4/2008 | Ferrario | G03B 15/05 323/234 |
| 2008/0150619 | A1 * | 6/2008 | Lesso | H02M 3/07 327/536 |
| 2008/0150620 | A1 * | 6/2008 | Lesso | H02M 3/07 327/536 |
| 2008/0150621 | A1 * | 6/2008 | Lesso | H02M 3/07 327/536 |

(Continued)

FOREIGN PATENT DOCUMENTS

DE     10 2010 053598     6/2012

*Primary Examiner* — Richard Isla
*Assistant Examiner* — Dung V Bui
(74) *Attorney, Agent, or Firm* — Knobbe, Martens, Olson & Bear, LLP

(57) ABSTRACT

This disclosure provides systems, methods and apparatus for an energy storage system. In one aspect, the energy storage system includes a controller configured to connect a capacitor system in series with an output of a battery system during a regenerative event such that the voltage of the capacitor system is subtracted from the voltage of the battery system.

31 Claims, 4 Drawing Sheets

(56) References Cited

U.S. PATENT DOCUMENTS

| | | |
|---|---|---|
| 2008/0246443 A1 | 10/2008 | Doljack |
| 2008/0315829 A1 | 12/2008 | Jones et al. |
| 2012/0074775 A1 | 3/2012 | Winkler et al. |
| 2012/0133203 A1* | 5/2012 | Lienkamp ............... B60L 7/14 |
| | | 307/9.1 |
| 2012/0133309 A1* | 5/2012 | Sean ...................... H02J 7/14 |
| | | 318/139 |
| 2013/0062940 A1* | 3/2013 | Winkler ................ B60R 16/03 |
| | | 307/10.1 |
| 2016/0105098 A1* | 4/2016 | Savulak ................. H02M 3/04 |
| | | 323/234 |

* cited by examiner

APPARATUS AND METHOD FOR PROVIDING BIDIRECTIONAL VOLTAGE SUPPORT

CROSS-REFERENCE TO RELATED APPLICATIONS

This application claims the benefit of U.S. Provisional Patent Application No. 62/066,733, filed Oct. 21, 2014, entitled "APPARATUS AND METHOD FOR PROVIDING BIDIRECTIONAL VOLTAGE SUPPORT," the disclosure of which is incorporated herein by reference in its entirety.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to systems and methods for providing bidirectional voltage support for an energy storage system. In particular, the systems and methods use an energy storage system that provides greater power performance, such as a capacitor system, in combination with an energy storage system that provides greater energy performance, such as a battery.

Description of the Related Art

Different mechanisms for combining an energy storage system, such as a battery, and a capacitor system exist in order to meet output voltage requirement windows. However, conventional systems do not provide efficient mechanisms for combining battery system and capacitor systems without adding complicated circuitry which leads to expense and reduced reliability in an electrical system.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for providing bidirectional voltage support for an output of a battery system. The apparatus includes: a capacitor system including a positive terminal and a negative terminal; and a controller configured to connect the negative terminal of the capacitor system to a positive terminal of a battery system and to connect the positive terminal of the capacitor system to the output of the battery system when a voltage of the output of the battery system is at or below a first voltage threshold and connect the positive terminal of the capacitor system to the positive terminal of the battery system and to connect the negative terminal of the capacitor system to the output of the battery system when the voltage of the output of the battery system is at or above a second voltage threshold In one aspect, the controller is further configured to connect the positive terminal of the capacitor system to the positive terminal of the battery system and to the output of the battery system when the voltage of the output of the battery system is between the first and second voltage thresholds.

In one aspect, the first voltage threshold is approximately a discharge voltage threshold of the battery system. In another aspect, the second voltage threshold is approximately a charge voltage threshold of the battery system.

In one aspect, the apparatus further includes a charging circuit configured to selectively connect the negative terminal of the capacitor system to an electrical ground. In one aspect, the charging circuit includes a resistor. In another aspect, the charging circuit comprises a DC to DC converter. In one aspect, the controller is further configured to detect the output voltage of the battery system. In another aspect, the apparatus further includes the battery system.

In one aspect, the apparatus further includes first, second, third and fourth switches wherein: the first switch is between the positive terminal of the capacitor system and the positive terminal of the battery system; the second switch is between the positive terminal of the capacitor system and the output of the battery system; the third switch is between the negative terminal of the capacitor system and the positive terminal of the battery system; and the fourth switch is between the negative terminal of the capacitor system and the output of the battery system, wherein the controller is configured to selectively move each of the first, second, third and fourth switches between an open and closed position.

In another aspect, the apparatus further includes a fifth switch between the negative terminal of the capacitor system and a charging circuit, wherein the controller is configured to selectively move the fifth switch between an open and closed position.

Another innovative aspect of the subject matter described in this disclosure can be implemented in a method for providing bidirectional voltage support for an output of a battery system. The method includes: providing a capacitor system comprising a positive terminal and a negative terminal; connecting the negative terminal of the capacitor system to a positive terminal of a battery system and connecting the positive terminal of the capacitor system to the output of the battery system when a voltage of the output of the battery system is at or below a first voltage threshold; and connecting the positive terminal of the capacitor system to the positive terminal of the battery system and connecting the negative terminal of the capacitor system to the output of the battery system when the voltage of the output of the battery system is at or above a second voltage threshold.

In one aspect, the method further includes connecting the positive terminal of the capacitor system to the positive terminal of the battery system and to the output of the battery system when the voltage of the output of the battery system is between the first and second voltage thresholds.

In one aspect, the first voltage threshold is approximately a discharge voltage threshold of the battery system. In one aspect, the second voltage threshold is approximately a charge voltage threshold of the battery system. In one aspect, the method further includes selectively charging the capacitor system by connecting the negative terminal of the capacitor system to an electrical ground via a charging circuit. In one aspect, the charging circuit comprises a resistor. In another aspect, the charging circuit comprises a DC to DC converter. In one aspect, the method further includes detecting the output voltage of the battery system.

In another aspect, the method further includes: connecting the positive terminal of the capacitor system to the positive terminal of the battery system comprises closing a first switch; connecting the positive terminal of the capacitor system to the output of the battery system comprises closing a second switch; connecting the negative terminal of the capacitor system to the positive terminal of the battery system comprises closing a third switch; and connecting the negative terminal of the capacitor system to the output of the battery system comprises closing a fourth switch.

In one aspect, the method further includes: connecting the negative terminal of the capacitor system to a charging circuit, wherein connecting the negative terminal of the capacitor system to the charging circuit further comprises closing a fifth switch.

Another innovative aspect of the subject matter described in this disclosure can be implemented in an apparatus for providing bidirectional voltage support for an output of a battery system. The apparatus includes: a capacitor system comprising a positive terminal and a negative terminal; a first switch configured to provide selective communication between the positive terminal of the capacitor system and the positive terminal of the battery system; a second switch configured to provide selective communication between the positive terminal of the capacitor system and the output of the battery system; a third switch configured to provide selective communication between the negative terminal of the capacitor system and the positive terminal of the battery system; a fourth switch configured to provide selective communication between the negative terminal of the capacitor system and the output of the battery system; and a fifth switch configured to provide selective communication between the negative terminal of the capacitor system and a charging circuit.

In one aspect, the apparatus further includes a controller configured to close the first and the fourth switches when a voltage of the output of the battery system is at or below a first voltage threshold.

In one aspect, the controller is further configured to close the second and third switches when the voltage of the output of the battery system is at or above a second voltage threshold. In one aspect, the controller is further configured to close the first and the second switches when the voltage of the output of the battery system is between the first and second voltage thresholds.

In one aspect, the first voltage threshold is approximately a discharge voltage threshold of the battery system. In one aspect, the second voltage threshold is approximately a charge voltage threshold of the battery system. In one aspect, the controller is further configured to detect the output voltage of the battery system.

In one aspect, the apparatus further includes a charging circuit configured to selectively connect the negative terminal of the capacitor system to an electrical ground. In one aspect, the charging circuit comprises a resistor. In another aspect, the charging circuit comprises a DC to DC converter. In one aspect, the apparatus further includes the battery system.

Details of one or more implementations of the subject matter described in this disclosure are set forth in the accompanying drawings and the description below. Although the examples provided in this disclosure are primarily described in terms of vessels, for example a hybrid vehicle system or the electrical systems of an aircraft, the concepts provided herein may apply to other types of systems with or within which an energy storage system is implemented. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DESCRIPTION

Figure 1A:
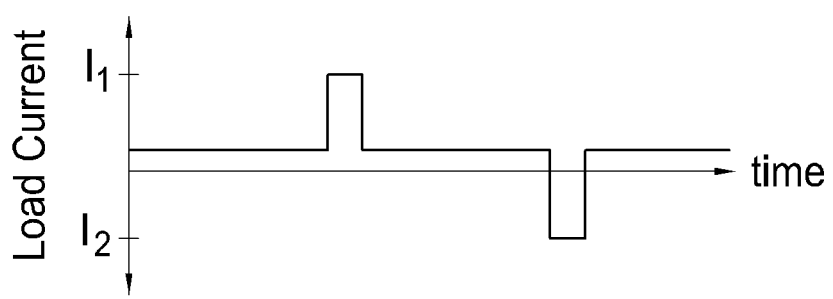
FIGS. 1a and 1b show two graphs illustrating a current profile for a battery system experiencing a bidirectional load over time, and a corresponding voltage profile over time of the battery system providing energy to the load.

Electrical systems connected to a battery system often have a voltage tolerance window outside of which the electrical system has reduced performance, cannot operate properly or may be damaged. Battery systems providing energy and energy storage for an electrical system may also have their own voltage tolerance windows. For example, battery systems may sustain damage resulting in reduced performance or failure if allowed to discharge to or below a discharge voltage threshold. Battery systems can also sustain damage resulting in reduced performance or failure, if allowed to charge to or above a charge voltage threshold. The electrical systems to which the output of a battery system may be connected sometimes generate currents or demand currents from the battery system that pushes the voltage of the output of the battery system outside of its tolerance window.

In addition, often battery systems may be limited in their capacity to accept charge, due to their internal resistance. Thus, the charge voltage threshold of these battery systems is often limited to a value close to their nominal open circuit voltage. Additionally, battery systems can be limited in their ability to rapidly discharge, due to their internal resistance.

Embodiments of a bidirectional voltage support apparatus for the output of a battery system can provide voltage support from another energy system, such as a capacitor system, to prevent the output node voltage from dropping below or rising above a tolerance window. Particularly, there can be a greater need for providing voltage support to battery systems during increased charge and discharge events.

As an example, in a hybrid electrical/gasoline automobile which utilizes a 12 Volt (V) battery system, the vehicle electronics might operate within a voltage tolerance window of 10 V to 14 V. However, current loads can swing the output of the 12 V battery system between 6 V, during an increased discharge event, to 16 V, during an increased charge event. In this scenario, a voltage support system which keeps the output voltage of the battery system between the tolerance window of 10 V to 14 V can be beneficial.

There are many applications in which a battery system may experience an increased charge or discharge event. Examples include regenerative breaking in a hybrid automobile, an aircraft landing on an aircraft carrier, light rail systems, a micro hybrid automobile, and/or other systems. For example, some aircrafts have battery banks connected to a DC bus which is in turn connected to the aircraft launcher mechanism. A DC bus is, for example, an electrical power distribution system to which all the loads and batteries of the aircraft are connected. The aircraft launcher mechanism can provide enough boost power to launch the aircraft from a carrier. When the aircraft lands on the carrier, the DC bus also sees a massive amount of voltage from the regenerative breaking of the aircraft. However, often the DC bus is also connected to other more sensitive electronics like Air Conditioning (AC), lights, radars, power electronics, etc.

In an example 1000 V DC bus system, the connection with these more sensitive electronics can dictate, for example, a ±20% voltage tolerance window for the aircraft DC bus, while the battery banks may swing within a higher voltage tolerance of, for example, ±40%. Since the DC bus may also be connected to mechanisms within the aircraft which absorb the massive voltage generated due to regenerative breaking of the aircraft during landing, the sensitive electronics connected to the DC bus can be subjected to damaging higher voltages. Consequently, a voltage support system to limit the voltage seen by the electrical power distribution system or the output node of the battery systems can be beneficial.

Battery systems generally utilize a chemical reaction to store and deliver energy. Several disadvantages are observed due to the nature of energy storage in these battery systems. For example, such a battery system has diminished capacity to efficiently absorb and store high currents generated due to increased charge events, for example, currents generated during regenerative breaking in an aircraft, hybrid or micro hybrid vehicle. Additionally, battery systems relying on chemical reactions cannot efficiently meet sudden and sharp load current demands at their outputs. An example of a sudden and sharp demand in load current demand is when a driver of a hybrid vehicle presses the accelerator on a steep incline.

Figure 1B:
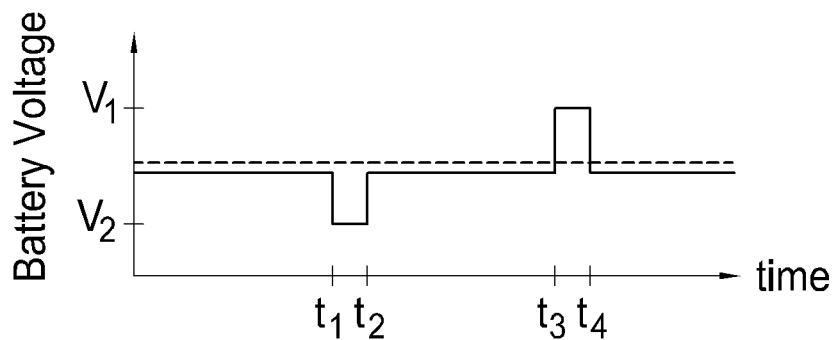

FIGS. 1a and 1b show a graph of an example current profile of a bidirectional load connected to a battery system, and a graph of the voltage seen at the output of the battery system, respectively. FIG. 1a, on the Y axis, shows the current profile of the bidirectional load versus time on the X axis. A current draw (from the battery system, to the load) is shown as positive; a current surplus, or generation of current (towards the battery system, from the load) is shown as negative. FIG. 1b, on the Y axis, shows the voltage of the output of the battery system connected to the bidirectional load versus time on the X axis.

Referring to FIG. 1a, between the times $t_1$ and $t_2$ there is a spike in the current demand from the load, for example as a result of a driver of a hybrid vehicle pressing the accelerator on a steep incline. Between the times $t_1$ and $t_2$, the battery is discharging and providing current to the output. Referring to FIG. 1b, between times $t_1$ and $t_2$ the corresponding voltage of the output node therefore drops to, for example, a voltage $V_2$. If the voltage $V_2$ is at or less than the discharge voltage threshold of the battery system, the battery system may sustain damage.

Referring again to FIG. 1a, between the times $t_3$ and $t_4$, the load is generating an increase in current which flows to, and thus, charges the battery system. For example, the current may flow to the battery system in response to regenerative braking in a hybrid vehicle. Referring to FIG. 1b, between times $t_3$ and $t_4$, the corresponding voltage of the output node therefore rises to, for example, a voltage $V_1$. If the voltage $V_1$ is at or more than the charge voltage threshold of the battery system, the battery system may sustain damage. Conversely, if the voltages $V_1$ and $V_2$ are outside the tolerance window of other electronics connected to the output node, those electronics and their associated circuitry may sustain damage. Consequently, the voltage of the output node should be controlled such that voltages, $V_1$ and $V_2$, remain within the constraints of the battery system and the tolerance window of the electronics connected to the output node.

Combining an alternative energy storage system, such as a system comprising one or more capacitors or ultracapacitors, with a battery system can address the aforementioned disadvantages of a battery system. As described in the embodiments below, an alternative energy system can help maintain the voltage of the output node within acceptable constraints. For example, a capacitor system used in combination with a battery system has the ability to more efficiently absorb high currents generated during increased charge events than a standalone battery system. Similarly, a capacitor system used in combination with a battery system can quickly discharge and efficiently meet sudden and sharp current demands in the output of the battery system.

Figure 2:
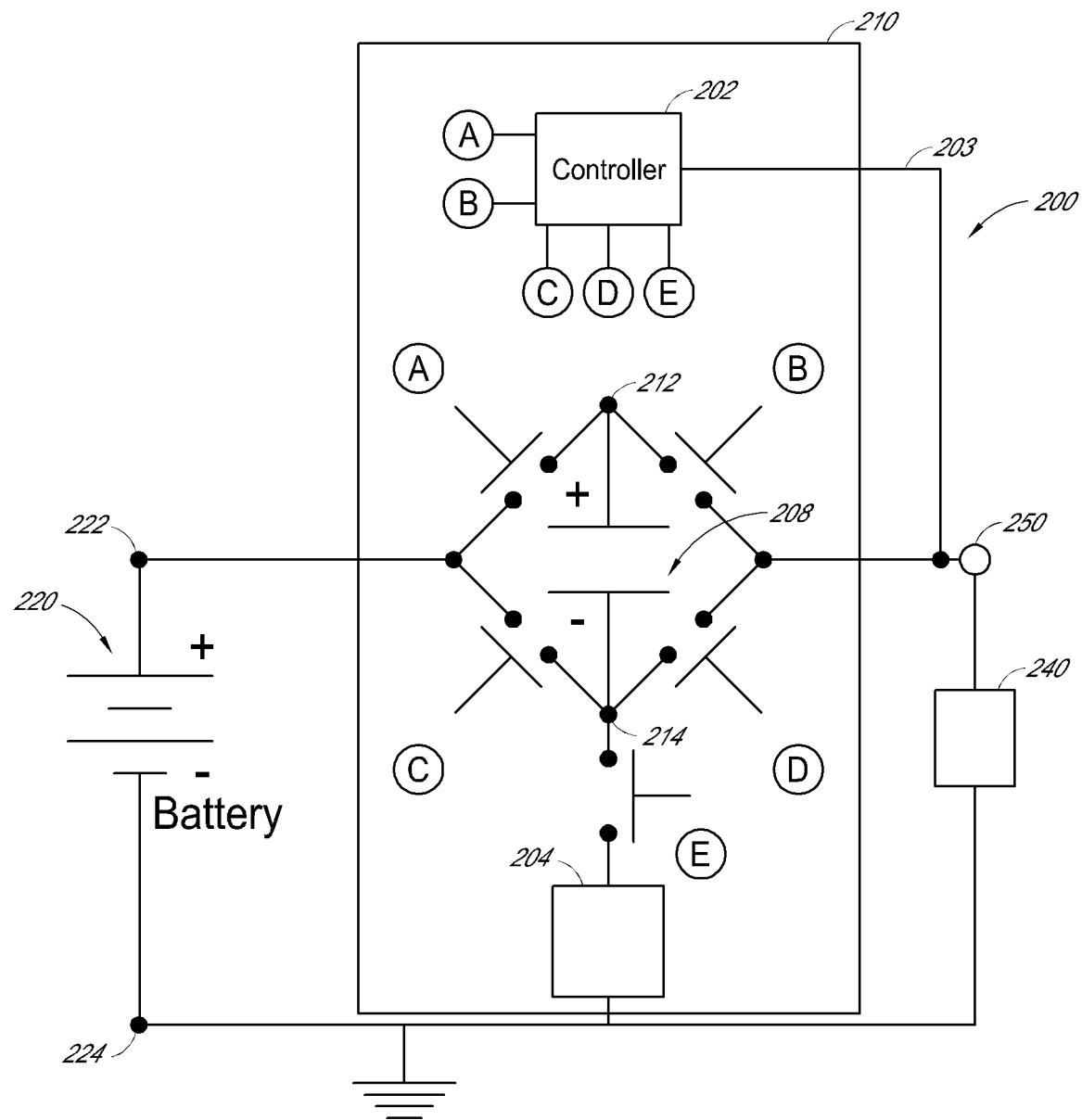
FIG. 2 shows a schematic view of an energy storage system according to an embodiment.

FIG. 2 demonstrates an embodiment of an energy storage system 200. The energy system 200 can include a voltage support system 210 capable of providing voltage support at an output node 250 of a battery system 220. The battery system 220 can include a positive battery terminal 222 and a negative battery terminal 224. The energy storage system 200 can provide bidirectional voltage support to the battery system 220 for bidirectional loads 240. Bidirectional loads can include loads that both demand current from the energy storage system 200 and at times generate or supply currents to the energy storage system 200. These bidirectional loads can include loads generating or demanding high currents and voltages, such as a hybrid vehicle drive system or an aircraft launcher. The bidirectional loads can include, or can be in communication with sensitive electronics with tighter voltage tolerance windows, such as gauges, lights, radars, stereo systems, air conditioning units, and/or other loads.

The voltage support system 210 can include a capacitor system 208 with a positive terminal 212 and negative terminal 214. The capacitor system can include one or more capacitors, ultracapacitors or any combination of energy storage systems that can provide increased, or even nearly instantaneous and efficient charge and discharge capability, relative to a battery system. The voltage support system 210 can include switches A, B, C, D and E. The switches A, B, C, D and E can be implemented by field effect transistors, for example, MOSFETs, or natural relays and power transistors, and/or any other device suitable to provide a switching function. Power transistors can be used to better control the ON resistance of the power transistor to provide a smoother voltage profile for the output node 250.

The system 210 can include charging circuit 204. Charging circuit 204 can include one or more resistors or DC to DC converters. In some embodiments, charging circuit 204 can be implemented using large resistors. Charging circuit 204 can comprise any configuration suitable for charging the capacitor system 208, as described further herein.

The switches A-E can be positioned in various positions relative to the capacitor terminals 212 and 214, the battery terminals 222 and 224, the charging circuit 204, and the output node 250. For example, switch A can be between the positive terminal 212 of the capacitor system and the positive terminal 222 of the battery system. Switch B can be between the positive terminal 212 of the capacitor system and the output node 250 of the battery system. Switch C can be between the negative terminal 214 of the capacitor system and the positive terminal 222 of the battery system.

Switch D can be between the negative terminal 214 of the capacitor system and the output node 250 of the battery system. Switch E can be between the negative terminal 214 of the capacitor system and the charging circuit 204. Switches A-E can be configured to provide selective communication between the aforementioned components corresponding to each switch.

The energy storage system 200 can include a controller 202 configured to selectively connect various other components of the energy storage system 200. For example, the controller 202 can be in communication with one or more of switches A-E, to provide selective communication through switches A-E. The controller 202 can be separate from, or included as a part of, the voltage support system 210. The controller 202 can be configured to connect the negative terminal 214 of the capacitor system to the positive terminal 222 of the battery system, and to connect the positive terminal 212 of the capacitor system to the output node 250 of the battery system. For example, the controller 202 can be configured to connect these aforementioned components when a voltage of the output 250 is at or below a first voltage threshold. Such a configuration can provide a combined voltage support mode to the battery system 220, as described further below.

The controller 202 can be further configured to connect the positive terminal 212 of the capacitor system to the positive terminal 222 of the battery system, and to connect the negative terminal 214 of the capacitor system to the output 250 of the battery system, when the voltage of the output 250 is at or above a second voltage threshold. Such a configuration can provide a regenerative voltage support mode to the battery system 220, as described further below.

The controller 202 can be further configured to connect the positive terminal 212 of the capacitor system to the positive terminal 222 of the battery system and to the output 250 of the battery system when the voltage of the output of the battery system is between the first and second voltage thresholds. Such a configuration can be used during a normal operating mode of the battery system 220 and energy storage system 200, as described further below. The controller 202 can be configured to connect the various components of the voltage support system 210, as described above, for example, using switches A-E, or other suitable components. It will be understood that controller 202 can be configured to connect and disconnect other components, and/or provide other controlling functionality to the voltage support system 210. Controller 202 can be configured to provide various controlling functionality to other components of energy storage system 200 and/or other systems.

Figure 3A:
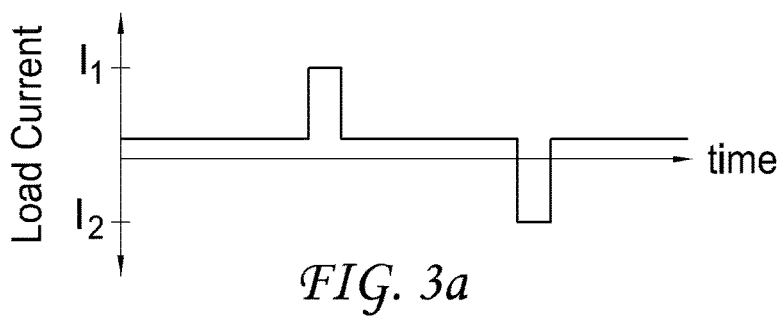
FIGS. 3a through 3e show various battery and capacitor system voltage profiles over time in relation to a corresponding current load profile for an energy storage system experiencing a bidirectional load according to the embodiment of FIG. 2.
Figure 3B:
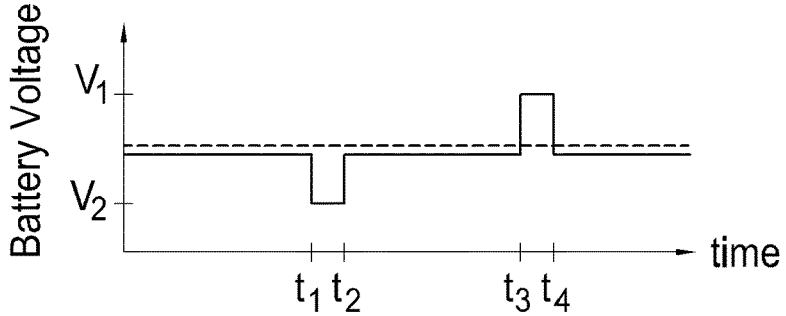
Figure 3C:
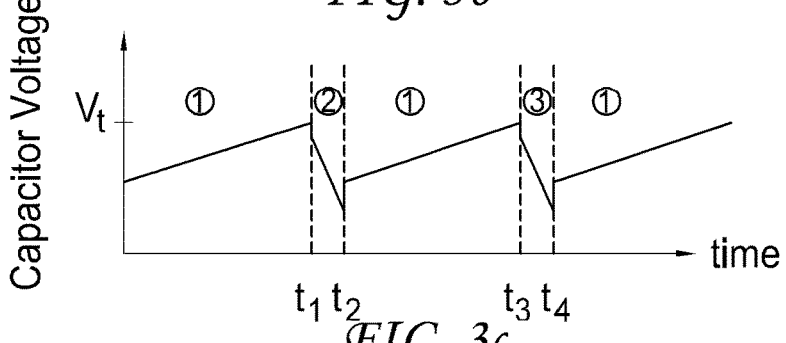
Figure 3D:
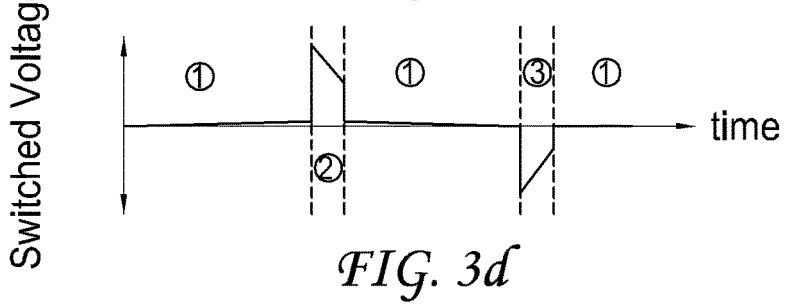
Figure 3E:
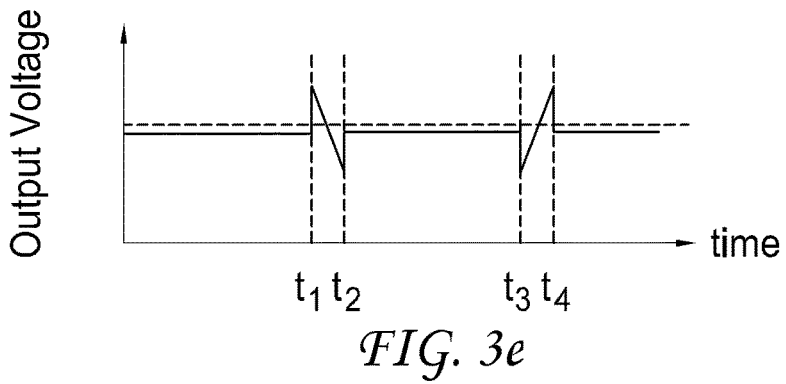

FIGS. 3a through 3e show various battery and capacitor system voltage profiles over time in relation to a corresponding current load profile for an energy storage system experiencing a bidirectional load according to the embodiment of FIG. 2. Specifically, FIG. 3a shows the load current generated from the load 240 (FIG. 2) over time. A current draw to the load 240 (from the battery system) is shown as positive; a current surplus, or generation of current (towards the battery system, from the load) is shown as negative. FIG. 3b shows the battery voltage profile over time, of the voltage difference between battery terminals 222 and 224 as the energy storage system 200 experiences a bidirectional load. FIG. 3c shows the capacitor voltage profile over time, of the voltage difference between capacitor terminals 212 and 214 as the energy storage system 200 experiences a bidirectional load. FIG. 3d shows the voltage profile of the voltage difference between nodes 216 and 218 over time as the energy storage system 200 experiences a bidirectional load. Stated differently, FIG. 3d shows the switched capacitor voltage profile, or the voltage contribution from the capacitor 208 which is added or subtracted to or from the battery voltage in FIG. 3b. FIG. 3e shows the resulting, combined, output voltage profile over time corresponding to the voltage at the output node 250, or the voltage difference over the load 240.

Referring to FIGS. 2 and 3a through 3e, the voltage support system 210 can be operated for example in three modes. As shown in FIGS. 3a through 3e, from time 0 to $t_1$, the system is in mode 1 or normal operation mode. From time $t_1$ to $t_2$, the system is in mode 2, or a combined voltage support mode, in which the switched capacitor voltage is added to the battery voltage, as described further below. From time $t_2$ to $t_3$, the system is in mode 1 or normal operation mode. From time $t_3$ to $t_4$, the system is in a regenerative voltage support mode 3 where the loads 240 generate currents to be absorbed by the energy storage system 210, and the capacitor voltage subtracts from the battery voltage as described further below. From time $t_4$ onward, the system is in normal operation mode until another voltage support or absorption event might occur.

In mode 1 or normal operation mode, switches A, B and E can be closed, for example, by controller 202. The charging circuit 204 can include a large enough resistor to make the current in the capacitor system branch negligible during mode 1. The capacitor system 208 and charging circuit 204 can therefore be chosen appropriately such that the contribution of the capacitor system 208 to the output voltage 250 during mode 1 or normal operation is negligible. This can, for example be implemented, by using a large resistor as the charging circuit. Exemplary values of such resistor can include 120 Ohm to keep the charge current under 100 milliamps (mA) for a 12 V system or 300 Ohms for a 1 farad (F) capacitor to give a 5 min time constant. As shown in FIG. 3c, the capacitor system 208 can then charge to a target voltage $V_t$. The controller 202 can be configured to open switch E and stop the capacitor system 208 from charging once the voltage of the capacitor reaches the target voltage $V_t$. $V_t$ can be a similar voltage as the battery system 220, or a different target voltage, based on the voltage tolerance windows the capacitor system is to support during mode 2 or mode 3.

From time $t_1$ to $t_2$, as shown in FIG. 3a, a spike in the load current demand might result in a drop in the battery voltage as shown in FIG. 3b. This can occur, for example, when the driver of a hybrid vehicle presses the accelerator on a steep incline. The system 210 can respond to (and thus compensate for) such a drop in battery voltage by entering combined voltage support mode 2 when the controller 202 closes switches B and C and opens the remaining switches. The controller 202 can enter mode 2, for example, when an output of the battery system is at or below a voltage threshold. For example, the controller 202 may be in communication with one or more sensors, such as a voltage sensor 203 (FIG. 2) that detects the voltage at output node 250. When the sensed voltage drops below a voltage threshold, the controller 202 can respond by entering mode 2. The voltage threshold can be set at, or slightly above, a discharge voltage threshold of the battery system, to prevent damage thereto.

In mode 2, with switches B and C closed, the capacitor system 208 which has been charged, for example, during mode 1 operation, is placed in series with the battery 220. Specifically, the capacitor system 208 is switched in series with the battery system 220 with a polarity such that the voltage of the charged capacitor system 208 is added to the voltage of the battery system 220 to compensate for the aforementioned drop in battery voltage. The series connection of the capacitor system 208 and the battery system 220 can be implemented by connecting the negative terminal 214 of the capacitor system 208 to the positive terminal 222 of the battery system 220 and connecting the positive terminal 212 of the capacitor system 208 to the output node 250. For example, in some embodiments, the controller 202 can accomplish this series connection by closing switches B and C as described above. FIG. 3d illustrates how, between the times $t_1$ to $t_2$, the voltage contribution from the capacitor 208 which is switched between the nodes 216 and 218 is a positive voltage relative to the voltage of the battery 220 and decreases with time as the capacitor discharges. As a result, and referring to FIG. 3e, the combined voltage seen at the output node 250 at time $t_1$ is quickly increased (due to the rapid discharge capability of the capacitor system 208), avoiding damage to the battery system due to a low voltage condition. The resulting increased voltage of the output node 250 decays between t1 and t2. However, the parameters of the energy storage system 200 can be chosen such that the resulting output voltage at t2 is still above a threshold discharge voltage of the battery system 220 or above a predetermined minimum voltage requirement of other electronics connected to the energy storage system 200.

For example, in a 12 V system, the output node can demand a current such that the output node voltage might be forced to drop 4 V. In this scenario, if the minimum voltage tolerance of the loads 240 is 10 V these electronics may not function properly since the output node would otherwise drop to 8 V. However, if the capacitor system is charged to 4 V (for example, during mode 1 normal operation), once the capacitor system is switched in during mode 2, the output node will have a combined voltage of 16 V, which includes both the battery voltage of 12 V and the capacitor system voltage of 4V, and will experience a 4 V drop from this combined voltage. In this scenario, the voltage of the output node decays 4 V from the combined initial 16 V, settling at 12 V, well above the minimum voltage requirement of the loads 240, which is 10 V in this example.

After the voltage support need is met and the load current returns to its normal levels, the controller can place the voltage support system 210 back into normal operation mode 1, between $t_2$ and $t_3$, and recharge the capacitor system 208 for future support or absorption needs.

At the start of a regenerative voltage support mode 3, at time $t_3$, and with reference to FIGS. 2, 3a and 3b, a sudden generation of current at the output node 250 occurs. An example of such an event includes regenerative breaking in a hybrid automobile or an aircraft landing on a carrier. As shown in FIG. 3b, this excess high current is forced into the battery causing a rise in the voltage of the output node 250. In response to, and to compensate for, this increase in current and battery output voltage, controller 202 can place the voltage support system 210 in regenerative voltage support mode 3, by closing switches A and D and opening the remaining switches. This arrangement switches capacitor system 208 in series with the battery system 220. However, with this arrangement, since the positive terminal 212 of the capacitor system is connected to the positive terminal 222 of the battery 220, the polarity of the capacitor system is reversed relative to the series arrangement of mode 2, and the voltage of the capacitor system is subtracted from, rather than added to, the voltage of the battery. The combined (subtracted) result is observed at the output node 250. The switched capacitor voltage resulting from this polarity reversal is shown in FIG. 3d, between the times $t_3$ and $t_4$., the series connection of the capacitor system 208 and the battery system 220 can be implemented by connecting the positive terminal 212 of the capacitor system 208 to the positive terminal 222 of the battery system 220 and connecting the negative terminal 214 of the capacitor system 208 to the output node 250. For example, in some embodiments, the controller 202 can accomplish this series connection by closing switches A and D as described above.

As further shown in FIG. 3d, between the times $t_3$ to $t_4$, the voltage contribution from the capacitor 208 which is switched between the nodes 216 and 218 is a negative voltage relative to the voltage of the battery 220 and increases with time as the capacitor discharges. As a result, the voltage of the output node 250 at time t3 quickly decreases, avoiding damage to the battery system due to an over voltage condition. The resulting decreased voltage of the output node 250 increases as the capacitor discharges between t3 and t4. However, the parameters of the energy storage system 200 can be chosen in a manner that the resulting output voltage at t4 is still below a threshold charge voltage of the battery system 220 or below a predetermined maximum voltage requirement of other electronics connected to the energy storage system 200.

For example, in a 12 V system, the bidirectional loads 240 can generate a current such that the output node voltage might be forced to rise by 4 V. In this scenario, if the maximum voltage tolerance of the loads 240 is 14 V, these electronics connected to the output node may sustain damage since the output node would otherwise rise to 16 V. However, if the capacitor system is charged to 4 V (for example during mode 1 normal operation), once the capacitor system is switched in during mode 3, the output node will experience a 4 V rise from an initial voltage which is the result of the capacitor system voltage subtracted from the battery voltage. In this scenario, the voltage of the output node starts rising from 8 V and settles to 12 V, well below the maximum voltage requirement of the loads 240, which is 14 V in this example.

The numbers and examples above are for illustration purposes only and applications of the present disclosure are not limited to the examples described above. In some embodiments, the capacitors can be sized and charged to a target voltage based on anticipated current demands or currents generated at the output of the energy storage system 200.

Figure 4:
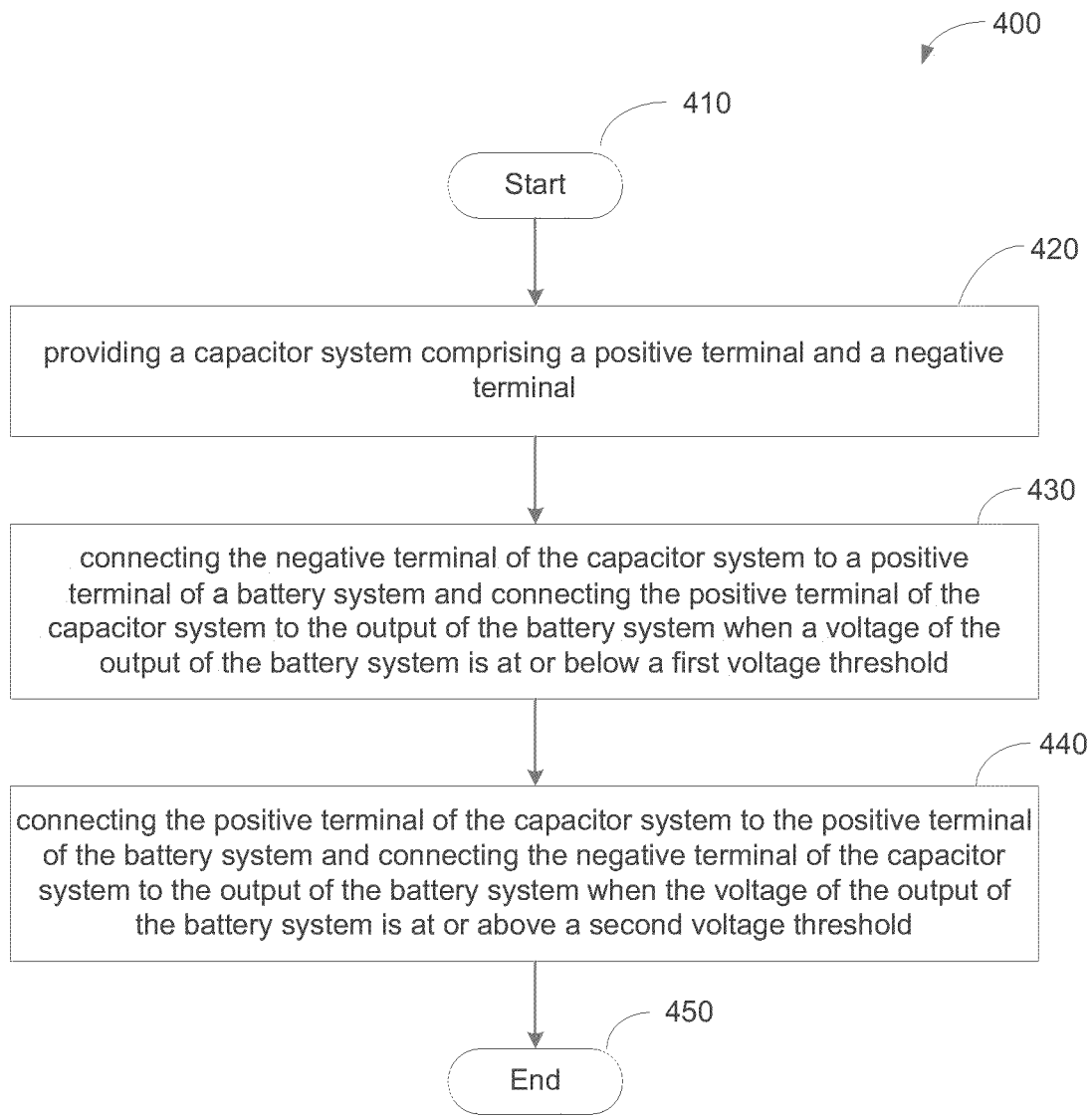
FIG. 4 is a flow diagram illustrating a method of operating an energy storage system, according to an embodiment.

FIG. 4 is a flow diagram illustrating a method 400 of operating an energy storage system according to an embodiment. Method 400 can be implemented, for example, using the energy system 200 illustrated in FIG. 2. The method 400 starts at block 410. The process then moves to block 420 by providing a capacitor system comprising a positive terminal and a negative terminal. The process then moves to block 430 by connecting the negative terminal of the capacitor system to a positive terminal of a battery system and connecting the positive terminal of the capacitor system to the output of the battery system when a voltage of the output of the battery system is at or below a first voltage threshold. The process then moves to block 440 by connecting the positive terminal of the capacitor system to the positive terminal of the battery system and connecting the negative terminal of the capacitor system to the output of the battery system when the voltage of the output of the battery system is at or above a second voltage threshold. The process subsequently ends at block 450.

The method 400 can include connecting the positive terminal of the capacitor system to the positive terminal of the battery system and to the output of the battery system when the voltage of the output of the battery system is between the first and second voltage thresholds. The method 400 can be implemented such that the first voltage threshold is approximately equal to the discharge voltage threshold of the battery system. The method 400 can also be implemented such that the second voltage threshold is approximately equal to the charge voltage threshold of the battery system. The method 400 can also include selectively charging the capacitor system by connecting the negative terminal of the capacitor system to an electrical ground via a charging circuit. The method 400 can be implemented by using a resistor as the charging circuit. The method 400 can also be implemented by using a DC to DC converter as the charging circuit. The method 400 can further include detecting the output voltage of the battery system.

The method 400 can also be implemented such that connecting the positive terminal of the capacitor system to the positive terminal of the battery system includes closing a first switch; connecting the positive terminal of the capacitor system to the output of the battery system includes closing a second switch; connecting the negative terminal of the capacitor system to the positive terminal of the battery system includes closing a third switch; and connecting the negative terminal of the capacitor system to the output of the battery system includes closing a fourth switch. The method 400 can also be implemented to include connecting the negative terminal of the capacitor system to a charging circuit, wherein connecting the negative terminal of the capacitor system to the charging circuit includes closing a fifth switch.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, or other device. In the alternative, the processor and the storage medium may reside as discrete components in a user terminal, or other device.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

It will also be understood that although many of the embodiments herein describe the use of various components in combination to form embodiments of a system and method for managing operation of a capacitor system in combination with a battery system, many of the components can be manufactured and provided independently without other components. For example, embodiments of the system and method for managing operation of a capacitor system, and any of the many other components described herein, or any combination thereof, can be provided separately, and/or as a kit. Thus, the invention is not to be limited otherwise.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

What is claimed is:

1. An apparatus for providing bidirectional voltage support for an output of a battery system, comprising:
   a capacitor system comprising a positive terminal and a negative terminal; and
   a controller configured to:
      simultaneously connect, in a first mode, both: (a) the negative terminal of the capacitor system to a positive terminal of a battery system and (b) the positive terminal of the capacitor system to the output of the battery system, when a voltage of the output of the battery system is at or below a first voltage threshold,
      simultaneously connect, in a second mode, both: (c) the positive terminal of the capacitor system to the positive terminal of the battery system and (d) the negative terminal of the capacitor system to the output of the battery system, when the voltage of the output of the battery system is at or above a second voltage threshold, and
      simultaneously connect, in a third mode, both: (e) the positive terminal of the capacitor system to the positive terminal of the battery system and to the output of the battery system and (f) the negative terminal of the capacitor system to an electrical ground through a charging circuit, when the voltage of the output of the battery system is between the first and second voltage thresholds,
   wherein the charging circuit is configured to charge the capacitor system when the voltage of the output of the battery system is between the first and second voltage thresholds in the third mode,
   wherein the controller is further configured to connect the negative terminal of the capacitor system to the electrical ground through the charging circuit while a voltage of the capacitor system is less than a target voltage in the third mode and disconnect the negative terminal of the capacitor system from the electrical ground through the charging circuit when the voltage of the capacitor system is substantially equal to the target voltage, and
   wherein the first, second, and third modes occur at different times from one another.

2. The apparatus of claim 1, wherein the first voltage threshold is approximately a discharge voltage threshold of the battery system.

3. The apparatus of claim 1, wherein the second voltage threshold is approximately a charge voltage threshold of the battery system.

4. The apparatus of claim 1, wherein the charging circuit is configured to selectively connect the negative terminal of the capacitor system to the electrical ground.

5. The apparatus of claim 4, wherein the charging circuit comprises a resistor.

6. The apparatus of claim 4, wherein the charging circuit comprises a DC to DC converter.

7. The apparatus of claim 1, wherein the controller is further configured to detect the voltage of the output of the battery system.

8. The apparatus of claim 1, further comprising the battery system.

9. The apparatus of claim 1, further comprising first, second, third and fourth switches wherein:
   the first switch is between the positive terminal of the capacitor system and the positive terminal of the battery system;
   the second switch is between the positive terminal of the capacitor system and the output of the battery system;
   the third switch is between the negative terminal of the capacitor system and the positive terminal of the battery system;
   the fourth switch is between the negative terminal of the capacitor system and the output of the battery system, and
   wherein the controller is configured to selectively move each of the first, second, third and fourth switches between an open and closed position.

10. The apparatus of claim 9 further comprising a fifth switch between the negative terminal of the capacitor system and the charging circuit, wherein the controller is configured to selectively move the fifth switch between an open and closed position.

11. The apparatus of claim 1, wherein a capacity and the target voltage of the capacitor system is determined based on anticipated current demands at the output of the battery system.

12. A method for providing bidirectional voltage support for an output of a battery system, comprising:
   providing a capacitor system comprising a positive terminal and a negative terminal;
   simultaneously connecting, in a first mode, both: (a) the negative terminal of the capacitor system to a positive terminal of a battery system and (b) the positive terminal of the capacitor system to the output of the battery system, when a voltage of the output of the battery system is at or below a first voltage threshold;
   simultaneously connecting, in a second mode, both: (c) the positive terminal of the capacitor system to the positive terminal of the battery system and (d) the negative terminal of the capacitor system to the output of the battery system, when the voltage of the output of the battery system is at or above a second voltage threshold; and
   simultaneously connecting, in a third mode, both: (e) the positive terminal of the capacitor system to the positive terminal of the battery system and to the output of the battery system and (f) the negative terminal of the capacitor system to an electrical ground through a charging circuit, when the voltage of the output of the battery system is between the first and second voltage thresholds,
   wherein the charging circuit is configured to charge the capacitor system when the voltage of the output of the battery system is between the first and second voltage thresholds in the third mode, and wherein the first, second, and third modes occur at different times from one another.

13. The method of claim 12, wherein the first voltage threshold is approximately a discharge voltage threshold of the battery system.

14. The method of claim 12, wherein the second voltage threshold is approximately a charge voltage threshold of the battery system.

15. The method of claim 12, further comprising selectively charging the capacitor system by connecting the negative terminal of the capacitor system to an electrical ground via the charging circuit.

16. The method of claim 15, wherein the charging circuit comprises a resistor.

17. The method of claim 15, wherein the charging circuit comprises a DC to DC converter.

18. The method of claim 12, further comprising detecting the output voltage of the battery system.

19. The method of claim 12, wherein:
connecting the positive terminal of the capacitor system to the positive terminal of the battery system comprises closing a first switch;
connecting the positive terminal of the capacitor system to the output of the battery system comprises closing a second switch;
connecting the negative terminal of the capacitor system to the positive terminal of the battery system comprises closing a third switch; and
connecting the negative terminal of the capacitor system to the output of the battery system comprises closing a fourth switch.

20. The method of claim 19, further comprising:
connecting the negative terminal of the capacitor system to the charging circuit, wherein connecting the negative terminal of the capacitor system to the charging circuit further comprises closing a fifth switch. further comprises closing a fifth switch.

21. An apparatus for providing bidirectional voltage support for an output of a battery system, comprising:
a capacitor system comprising a positive terminal and a negative terminal;
a first switch configured to provide selective communication between the positive terminal of the capacitor system and the positive terminal of the battery system;
a second switch configured to provide selective communication between the positive terminal of the capacitor system and the output of the battery system;
a third switch configured to provide selective communication between the negative terminal of the capacitor system and the positive terminal of the battery system;
a fourth switch configured to provide selective communication between the negative terminal of the capacitor system and the output of the battery system; and
a fifth switch configured to provide selective communication between the negative terminal of the capacitor system and a charging circuit that is coupled to an electrical ground,
wherein the charging circuit is configured to charge the capacitor system when the voltage of the output of the battery system is between a first voltage threshold and a second voltage threshold in a mode during which the first switch, the second switch, and the fifth switch are simultaneously closed and wherein the charging circuit comprises a DC to DC converter.

22. The apparatus of claim 21, further comprising a controller configured to close the first and the fourth switches when a voltage of the output of the battery system is at or below the first voltage threshold.

23. The apparatus of claim 22, wherein the controller is further configured to close the second and third switches when the voltage of the output of the battery system is at or above the second voltage threshold.

24. The apparatus of claim 23, wherein the controller is further configured to close the first and the second switches when the voltage of the output of the battery system is between the first and second voltage thresholds.

25. The apparatus of claim 22, wherein the first voltage threshold is approximately a discharge voltage threshold of the battery system.

26. The apparatus of claim 23, wherein the second voltage threshold is approximately a charge voltage threshold of the battery system.

27. The apparatus of claim 23, wherein the controller is further configured to detect the output voltage of the battery system.

28. The apparatus of claim 21, wherein the charging circuit is configured to selectively connect the negative terminal of the capacitor system to an electrical ground.

29. The apparatus of claim 28, wherein the charging circuit comprises a resistor.

30. The apparatus of claim 21, further comprising the battery system.

31. An apparatus for providing bidirectional voltage support for an output of a battery system, comprising:
a capacitor system comprising a positive terminal and a negative terminal; and
a controller configured to:
simultaneously connect, in a first mode, both:
(1) the negative terminal of the capacitor system to a positive terminal of a battery system, and
(2) the positive terminal of the capacitor system to the output of the battery system, when a voltage of the output of the battery system is at or below a first voltage threshold,
Simultaneously connect, in a second mode, both:
(3) the positive terminal of the capacitor system to the positive terminal of the battery system, and
(4) the negative terminal of the capacitor system to the output of the battery system, when the voltage of the output of the battery system is at or above a second voltage threshold, and
simultaneously connect, in a third mode, all of:
(3) the positive terminal of the capacitor system to the positive terminal of the battery system,
(2) the positive terminal of the capacitor system to the output of the battery system, and
(5) the negative terminal of the capacitor system to an electrical ground through a charging circuit, when the voltage of the output of the battery system is between the first and second voltage thresholds in the third mode, and wherein the first, second, and third modes occur at different times from one another.

* * * * *